United States Patent [19]

Bando

[11] Patent Number: 5,616,064

[45] Date of Patent: Apr. 1, 1997

[54] PLATE-LIKE GLASS MATERIAL, ETC., WORKING DEVICE

[75] Inventor: Shigeru Bando, Tokushima, Japan

[73] Assignee: Bando Kiko Co., Ltd., Tokushima, Japan

[21] Appl. No.: 185,843

[22] PCT Filed: Jun. 8, 1993

[86] PCT No.: PCT/JP93/00767

§ 371 Date: Jan. 21, 1994

§ 102(e) Date: Jan. 21, 1994

[87] PCT Pub. No.: WO93/25488

PCT Pub. Date: Dec. 23, 1993

[30] Foreign Application Priority Data

Jun. 12, 1992 [JP] Japan .................................. 4-179194

[51] Int. Cl.$^6$ ..................................................... B24B 1/00
[52] U.S. Cl. .................................. 451/5; 451/44; 451/70; 451/257; 225/2; 225/96.5
[58] Field of Search .................... 451/5, 41, 43, 451/44, 178, 179, 388, 69, 70, 257; 225/96.5, 2; 83/880

[56] References Cited

U.S. PATENT DOCUMENTS

| | | |
|---|---|---|
| 3,581,443 | 6/1971 | Mayers et al. . |
| 4,698,088 | 10/1987 | Bando . |
| 5,005,318 | 4/1991 | Shafer . |
| 5,079,876 | 1/1992 | Zumstein . |
| 5,396,736 | 3/1995 | Bando ........................................ 451/5 |

FOREIGN PATENT DOCUMENTS

| | | |
|---|---|---|
| 58-217440 | 12/1983 | Japan . |
| 61-210057 | 9/1986 | Japan . |
| 61-270057 | 11/1986 | Japan . |
| 62-78123 | 4/1987 | Japan . |
| 63-156029 | 6/1988 | Japan . |
| 63-215527 | 9/1988 | Japan . |
| 2-185363 | 7/1990 | Japan . |
| 3-88737 | 4/1991 | Japan . |
| 3-164441 | 7/1991 | Japan . |

*Primary Examiner*—Willis Little
*Assistant Examiner*—Eileen P. Morgan
*Attorney, Agent, or Firm*—Nixon & Vanderhye

[57] ABSTRACT

A plate-like glass material working device 1 provided with a breaking-off unit 2, an input unit 3 for inputting various breaking-off data items and commands to the device; a storage unit 5 from which data on the shape of a target plate of glass 300 stored beforehand therein is read out in accordance with a command from the input unit 3; a display unit 7 for displaying thereon the shape of the Target plate of glass 300 on the basis of the shape data read out from the storage unit 5 and displaying the shape of a plate-like glass material 6 to be worked, an end cutting line forming position and a pressing position on the plate-like glass material in accordance with breaking-off data and a command from the input unit 3; and a control unit 8 for controlling the operation of the breaking-off unit 2 in correspondence to the shape of the target plate of glass 300, the shape of the plate-like glass material 6, end cutting line forming position and pressing position displayed on the glass material on the display unit 7.

5 Claims, 5 Drawing Sheets

PLATE-LIKE GLASS MATERIAL, ETC., WORKING DEVICE

TECHNICAL FIELD

The present invention relates to devices for working a plate-like material, for example, of glass, and more particularly to a plate-like glass material working device for working a plate-like glass material wherein a plate-like glass material is broken off to provide a glass article having a predetermined shape.

BACKGROUND ART

Conventionally, in order to obtain a plate of glass having a predetermined shape from a plate-like glass material, the glass material is placed on a main cutting line forming unit to form a main cutting line on the plate-like glass material. The resulting plate-like glass material is then placed on an end cutting line forming and breaking-off unit to form an end cutting line thereon. The resulting glass material is then pressed at predetermined places thereof and broken off along the main cutting line thereof. In order to use the plate-like glass material in a waste-free manner conventionally, a plate-like glass material corresponding to the shape of a target plate of glass as a final article is selected. The main cutting line forming unit and the end cutting line and breaking off unit are manually adjusted and set in position relative to the selected glass material.

This operation is troublesome and very low in efficiency. For example, each time a plate-like glass material having a different shape is used, the main cutting line forming position, an auxiliary cutting line forming position, and pressing position are required to be reset.

Such problem occurs not only in working a plate-like glass material, but also in working a general plate-like material.

The present invention is made in view of such problem. It is an object of the present invention to provide a plate-like glass material working device capable of easily setting a main cutting line forming position, auxiliary cutting forming position and pressing position depending on the shape of the plate-like glass material, and rapidly working the plate-like glass material automatically.

DISCLOSURE OF THE INVENTION

According to the present invention, the above object is achieved by a plate-like glass material working device including: breaking-off means, input means for inputting various breaking-off data items and commands to the device; storage means from which data on the shape of a target plate of glass stored beforehand therein is read out in accordance with a command from the input means; display means for displaying thereon the shape of the target plate of glass on the basis of the shape data read out from the storage means and displaying the shape of a plate-like glass material to be worked, an end cutting line forming position and a pressing position in accordance with breaking-off data and a command from the input means; and control means for controlling the operation of the breaking-off means in correspondence to the shape of the target plate of glass, the shape of the plate-like glass material, the end cutting line forming position and the pressing position displayed on the display means.

In the present invention, one of the breaking-off means includes: main cutting line forming means for forming a main cutting line on a plate-like glass material, end cutting line forming means for forming an end cutting line on the plate-like glass material on which the main cutting line has been formed by the main cutting line forming means; breaking-off means for breaking off the plate-like glass material on which the end cutting line has been formed by the end cutting line forming means to break off the plate-like glass material along the main cutting line; and grinding means for grinding the periphery of the plate-like glass material broken-off along the main cutting line by the breaking-off means.

The breaking-off means may further include conveying means for conveying the plate-like glass material with the main cutting line formed thereon by the main cutting line forming means to the end cutting line forming means and said breaking-off means to form an end cutting line on the plate-like glass material with the main cutting line thereon formed by the main cutting line forming means and to break off along the main cutting line the plate-like glass material with the end cutting line formed thereon, and conveying the broken-off plate-like glass material to the grinding means to grind the periphery of the broken-off plate-like glass material.

One example of the storage means stores data on various different shapes of target plates of glass beforehand.

According to the present invention, the object is achieved by a plate-like material working device including: working means, input means for inputting various working data items and commands to the working device, storage means from which data on a target plate-like material stored beforehand is read in accordance with a command from the input means; display means for displaying the shape of the target plate-like material in accordance with the shape data read out from the storage means and the manner of working the plate-like material in accordance with working data and a command from the input means; and control means for controlling the operation of the working means in correspondence to the working manner displayed on the display means.

Plates of glass to be produced by the inventive working device are general building panes, furniture plates of glass and car panes such as front, rear or side panes, etc.

In the plate-like glass material working device according to the present invention data on the shape of one particular target plate of glass stored in the storage unit is read in accordance with a command from the input unit. The shape of the target plate of glass is displayed on the display means on the basis of the read shape data. Breaking-off data and a command are input from the input means in accordance with the display of the shape of the target plate of glass by the display means to thereby display on the display unit the shape of the plate-like glass material, and the end cutting line forming position and pressing position on the plate-like glass material. The control means controls the operation of the breaking-off means in correspondence to the displayed shapes of the target plate of glass and of the plate-like glass material, and the displayed end cutting line forming position and displayed pressing position on the plate-like glass material.

According to the present invention, the target plate of glass and the plate-like glass material are displayed on the display means, and the main cutting line forming position, the end cutting line forming position and the pressing position on the plate-like glass material are then set. Thus, those operations are very easy and the plate-like glass material is rapidly worked automatically.

The present invention will be described in more detail on the basis of a preferred embodiment thereof shown in the drawings to clarify the above invention and further inventions although the present invention is not limited to its embodiments.

EMBODIMENTS

In those FIGURES, a plate-like glass material working device 1 of an embodiment of the present invention is provided with a breaking-off unit 2, an input unit 3 which inputs various breaking-off data and commands to the device 1, storage unit 5 from which data on the shape of a target plate of glass 300 stored beforehand is read in accordance with a command from the input unit 3, a display 7 which displays the shape of the target plate of glass 300 on the basis of the shape data read from the storage unit 5, displays the shape of the plate-like glass material 6 to be worked, an end cutting line forming position and a pressing position on the basis of the breaking-off data and command from the input unit 3, and a control unit 8 which controls the operation of the breaking-off unit 2 in correspondence to the shapes of the target plate of glass 300 and plate-like glass material 6, the end cutting line forming position and the pressing position, which are displayed on the display unit 7.

The breaking-off unit 2 is provided with a main cutting line forming unit 11 which forms a main cutting line 10 on the plate-like glass material 6, end cutting line forming units 13 and 13a which form an end cutting line 12 on the plate-like glass material 6 on which the main cutting line is formed by the main cutting line forming unit 11, breaking-off units 14 and 14a which press and break off the plate-like glass material 6 with the end cutting line 12 formed thereon along the main cutting line 10, a grinding unit 16 which grinds the periphery 15 of the plate-like glass material 6 pressed and broken off along its main cutting line 10 by the breaking-off units 14 and 14a.

The breaking-off unit 2 is provided with a conveying unit 21 which conveys the plate-like glass material 6 with the main cutting line 10 thereon to the end cutting line forming units 13 and 13a and the breaking-off units 14 and 14a to from an end cutting line 12 on the plate-like material 6 and break off the plate-like glass material 6 along the main cutting line 10 and then to the grinding unit 16 to grind the periphery 15 of the plate-like glass material 6 pressed and broken off by the breaking units 14 and 14a along the main cutting line 10.

The main cutting line forming unit 11 is provided with a cutter head 32 which has a cutter or a cutter wheel 31, a support base 33 on which the plate-like glass material 6 is placed, a moving unit 34 which moves the cutter head 32 in an X direction, a moving unit 35 which moves the support base 33 in a Y direction perpendicular to the X direction. The cutter head 32 is provided with an air cylinder 36 which moves the cutter 31 up and down. The moving unit 34 is provided with a servo motor 38 attached to an upper frame 37 extending in the X direction, a screw shaft 42 which is supported rotatable at opposite ends on the upper frame 37 through bearings 39 and 40 and connected at one end through a pulley-belt unit 41 to the output shaft of the servo motor 38, and a slider 44 attached to a pair of parallel rails 43 which extends in the X direction and which is attached to a side of the upper frame 37 such that the slider is movable in the X direction. The slider 44 has fixed thereto a nut 55 screwed on the screw shaft 42 with the cutter head 32 being attached to the slider 44. The moving unit 35 is provided with a servo motor 46 attached to a base 45, a screw shaft 49 supported rotatably at opposite ends through bearings 47 and 48 to the base 45, and connected at one end to the rotational output shaft of the servo motor 46, and a slider 51 attached to a pair of parallel rails 50 which extends in the Y direction and which is attached to the base 45 such that the slider is movable in the Y direction. The slider 51 has fixed thereto a nut 52 which is screwed on the screw shaft 49 with the support base 33 being attached to the slider 51.

The end cutting line forming units 13 and 13a have structures similar to each other. The breaking-off units 14 and 14a also have structures similar to each other. The end cutting line forming units 13 and the breaking-off unit 14 performs an end cutting line forming operation and a breaking-off operation, relatively, on one half area of the plate-like glass material 6. The end cutting line forming units 13a and the breaking-off unit 14a performs an end cutting line forming operation and a breaking-off operation, respectively, on the other half of the plate-like glass material 6. Thus, the end cutting line forming unit 13 and the breaking-off unit 14 only will be described below and further description of the end cutting line forming unit 13a and the breaking-off unit 14a will be omitted with reference character a being used as an additional one in FIGS. as required.

The end cutting line forming unit 13 is provided with an end cutting line forming cutter or cutter wheel 61, an air cylinder 62 which moves the cutter 61 up and down, and a servo motor 63 which directs the cut edge of the cutter 61 toward the end cutting line. The cutter 61 and the rotational output shaft of the servo motor 63 is connected through a timing belt and a toothed pulley. The breaking-off unit 14 is provided with a pushing rod 64, an air cylinder 65 which moves the rod 64 up and down, and a plate-like glass material support/cullet discharge unit 66 (hereinafter referred to solely as a support unit 66). In the end cutting line forming unit 13 and breaking-off unit 14 of the device, the moving unit which moves the cutter 61 in the X and Y directions and the moving unit which the moves the pushing rod 64 in the Y and X directions are composed of common X and Y direction moving units 71 and 72. The Y direction moving unit 72 is provided with a servo motor 73, a screw shaft 75 connected at one end to the output shaft of the servo motor 73 and attached rotatably to the frame 74, and a slider 77 attached to a pair of parallel rails 76 so as to be movable in the Y direction with the pair of rails 76 being attached to the frame 74 and extending in the Y direction. The slider 77 has fixed thereto a nut (not shown) screwed on the screw-shaft 75 and has the air cylinder 62, servo motor 63 and air cylinder 65 attached thereto. The X direction moving unit 71 is provided with a servo motor 81, a screw shaft 83 connected at one end to the rotational output shaft of the servo motor 81 and attached rotatably to the frame 82, and a slider 85 attached to a pair of parallel rails 84 so as to be movable in the X direction with the pair of parallel rails 84 attached to the frame 82 and extending in the X direction. The slider 85 has fixed thereto a nut (not shown) screwed on the screw shaft 83 with the frame 74 being attached to the slider 85.

The support unit 66 is provided with a servo motor 91 attached to the base 45, a drive drum 94 supported rotatably on the base 45 through a support 92 and connected at one end to the rotational output shaft of the motor 91 through a pulley-belt 93-pulley mechanism, a follower drum 96 supported rotatably over the base 45 through a supports 95, and an endless flexible belt 97 extending around the drums 94 and 96, and a support plate 99 supported through supports 92, 95 and 98 to the base 45 and disposed on a lower surface of the endless belt 97 to support the endless belt 97. A cullet container 100 is disposed downstream of the support unit 66.

The grinding unit 16 is provided with a grinding head 112 which has a grinding wheel 111, a sucking unit 113 which sucks and holds the plate-like glass material 6 thereon, a moving unit 114 which moves the grinding head 112 in the X direction, and a moving unit 115 which moves the sucking unit 113 in the Y direction. The grinding head 112 has a motor 116 attached thereto for rotating the grinding wheel 111. The moving unit 114 is provided with a servo motor 118 attached to the upper frame 37, a screw shaft 122 supported at opposite ends rotatably to the upper frame 37 through bearings 119 and 120 and connected at one end to the rotational output shaft of the servo motor 118 through a pulley-belt mechanism 121, and a slider 124 movable in the X direction and attached to a pair of parallel rails 123 which extends in the X direction and which is attached to a side of the upper frame 37. The slider 124 has fixed thereto a nut 125 screwed on the screw shaft 122. The slider 124 has the grinding head 122 attached thereto through an X, Y and Z direction position finely adjusting unit 126, which is manually operated to adjust the respective positions of the grinding head 122 finely in the X, Y and Z directions with the Z direction being normal to an X-Y plane. The moving unit 115 is provided with a servo motor 131 attached to the base 45, a screw shaft 134 supported rotatably at opposite ends through bearings 132 and 133 and connected at one end to the output shaft of the servo motor 131, and a slider 136 movable in the Y direction and attached to a pair of parallel rails 135 which is in turn attached to the base 45 so as to extend in the Y direction. The slider 136 has fixed thereto a nut 137 which is screwed on the screw shaft 134, and has a sucking unit 113 attached thereto.

The conveying unit 21 is provided with a servo motor 141 attached to the upper frame 37, a screw shaft 145 supported rotatably at opposite ends through bearings 142 and 143 to the upper frame 37 and connected at one end to the rotational output shaft of the servo motor 141 through a pulley-belt mechanism 144, a slider 147 movable in the X direction and attached to a pair of parallel rails 146 which is in turn attached to the lower surface of the upper frame 37 and which extends in X direction, a support frame 150 attached through a bracket 148 and an arm 149 to one end of the slider 147, a support frame 152 attached through a bracket 151 to the other end of the slider 147, and lifting units 153, 154, 155 and 156 attached to the slider 147, support frames 150 and 152, respectively. The slider 147 has fixed a nut (not shown) screwed on the screw shaft 122. The frames 82 and 82a of the X direction moving units 71 and 71a are attached to the slider 147 through a bracket 157. The lifting unit 153–156 are provided with sucking units 161–164 and air cylinders 165–168 which move the sucking units 161–164 up and down.

The breaking-off unit 2 of the present embodiment is further provided with a plate-like glass material receiving table 200 on the inlet side and a plate-like glass material conveying unit 201 on the outlet side. The plate-like glass material receiving table 200 has rollers 203 and 204 thereon which position the plate-like glass material 6. The conveying unit 201 is provided with a motor 212 supported by a frame 211, a drive shaft 213 and a follower shaft 214 supported rotatably on the frame 211, and a plurality of endless belts 215 extending around the drive shaft 213 and the follower shaft 214. The output shaft of the motor 212 is connected through a belt-pulley mechanism to the drive shaft 213.

The input unit 3 is composed, for example, of a keyboard and a mouse, which are operated to input various breaking-off data and commands to the control unit 8. The display unit 7 is composed, for example, of a CRT display and performs various displaying operations on the basis of various breaking-off data and commands from the input unit 3 and data on the shapes of target plates of glass from the storage unit 5 through the control unit 8. The storage unit 5 is composed of a magnetic storage unit or a semiconductor storage unit which is in turn composed, for example, of a floppy disk, a hard disk or a MOS memory, and stores data on various shapes of target plates of glass beforehand. The control unit 8 is composed, for example, of a so-called computer which causes the breaking-off unit 2 to perform the following operation on the basis of a program stored beforehand in the storage unit in correspondence to data on the shape of the target plate of glass, the shape of a plate-like glass material, the end cutting line forming position and the pressing position which are displayed on the display unit 7.

Figure 1:
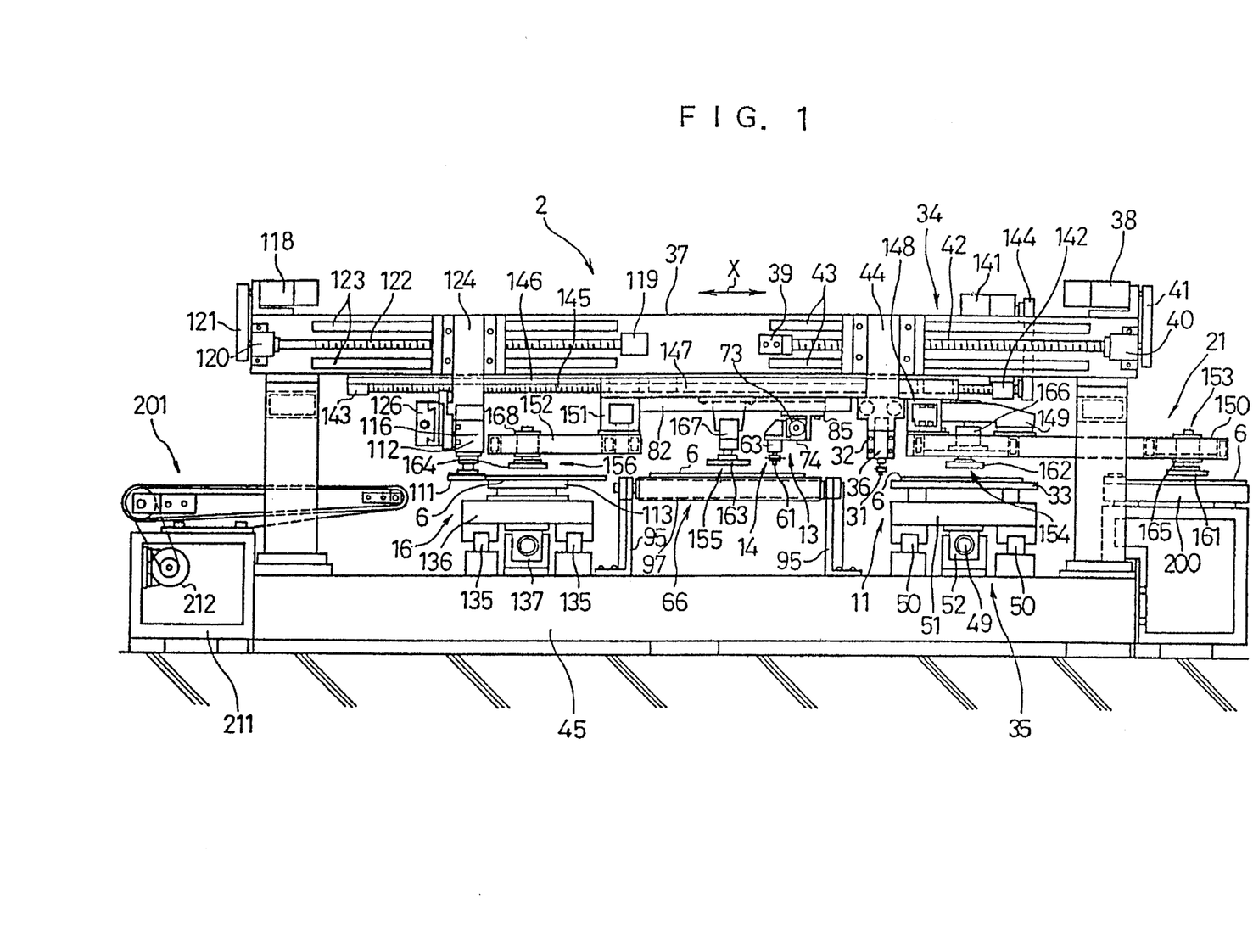
FIG. 1 is a front view of a preferred embodiment of the present invention.
Figure 2:
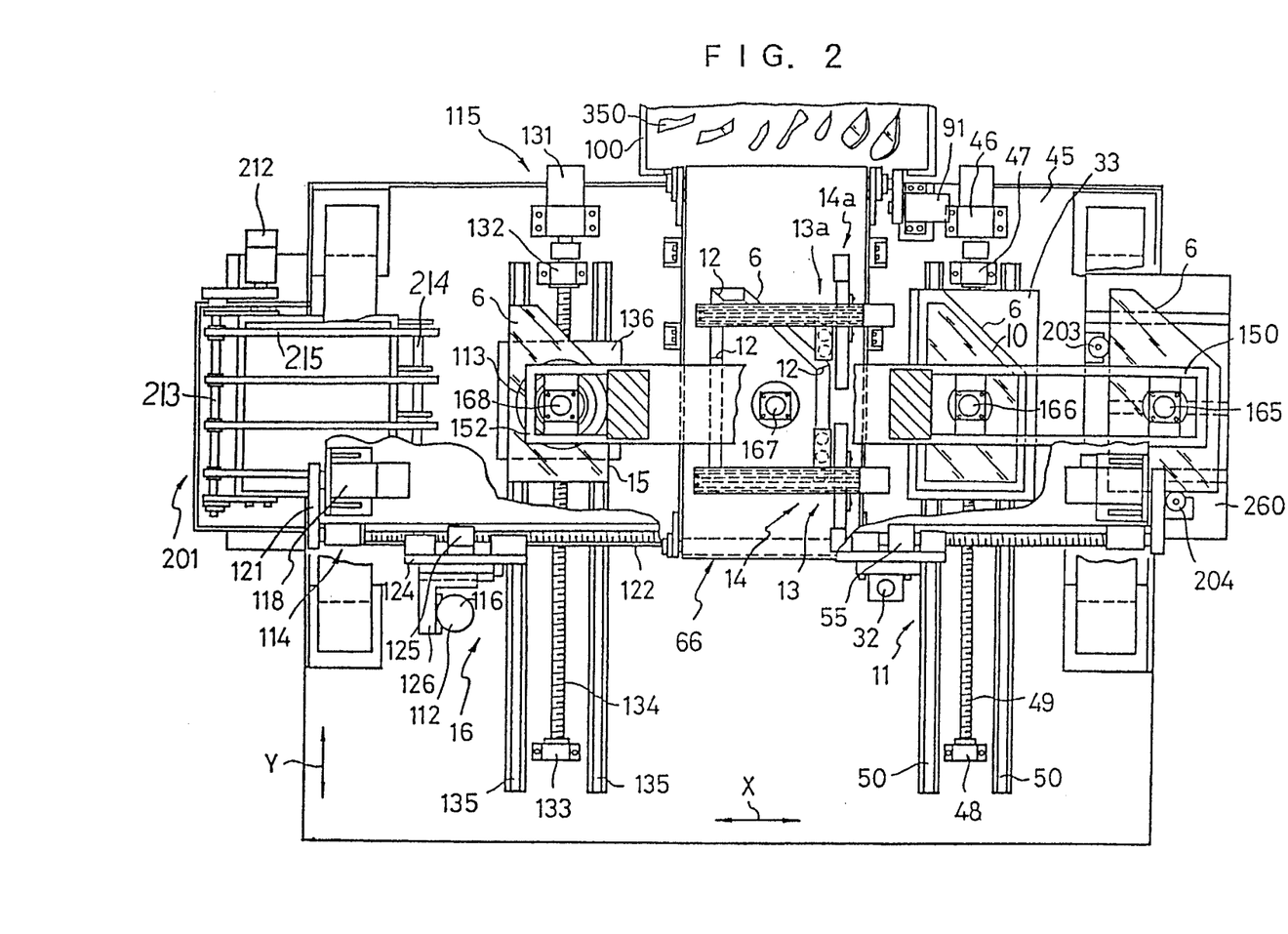
FIG. 2 is a plan view of the embodiment of FIG. 1.
Figure 3:
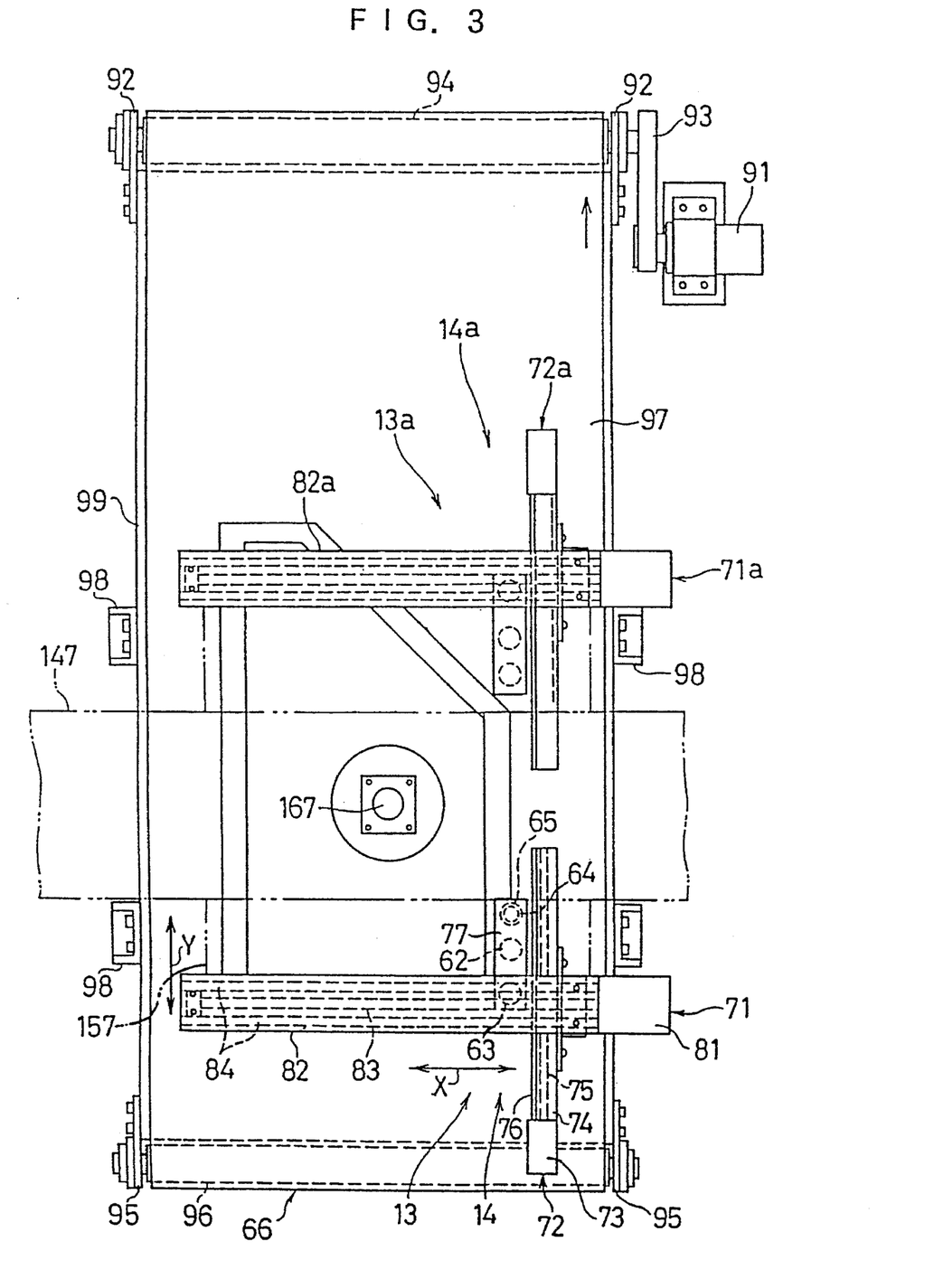
FIG. 3 is an enlarged plan view of an element of the embodiment of FIG. 1.
Figure 4:
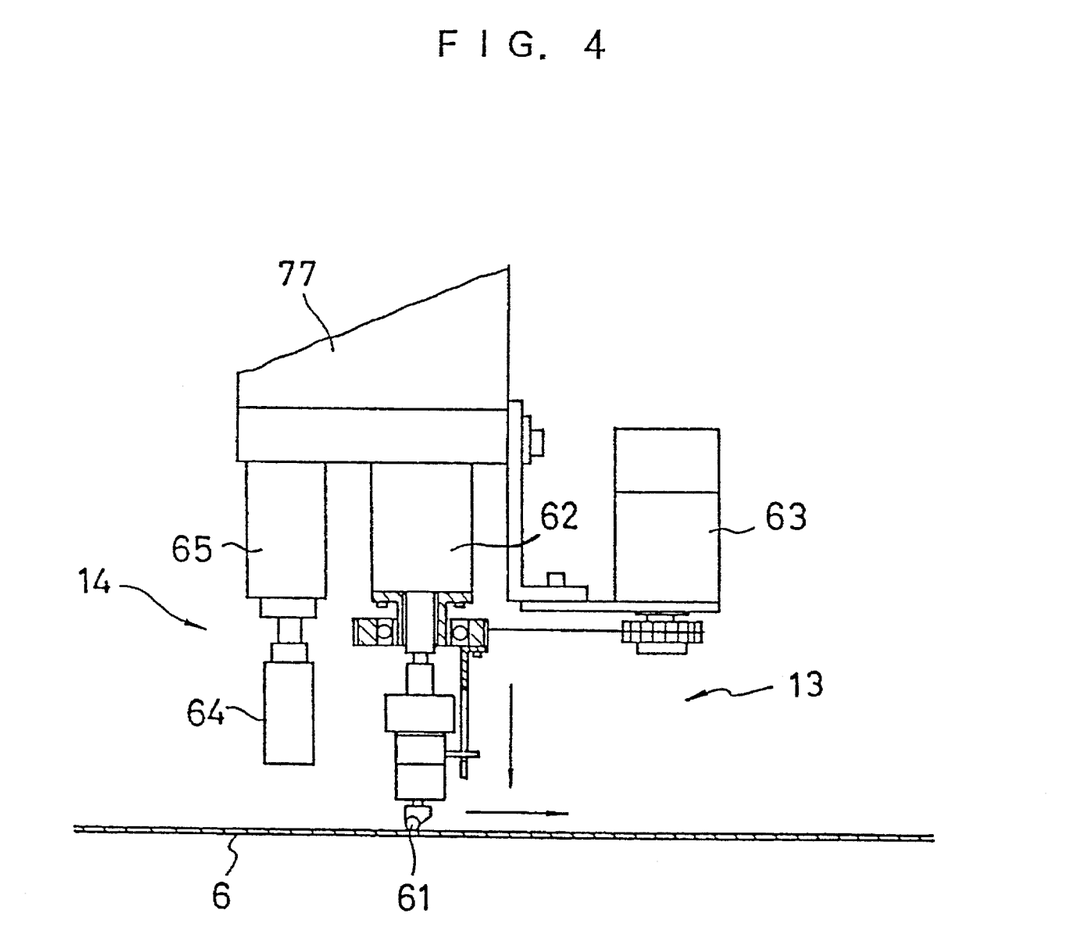
FIG. 4 illustrates part of the embodiment of FIG. 1 in detail.
Figure 5:
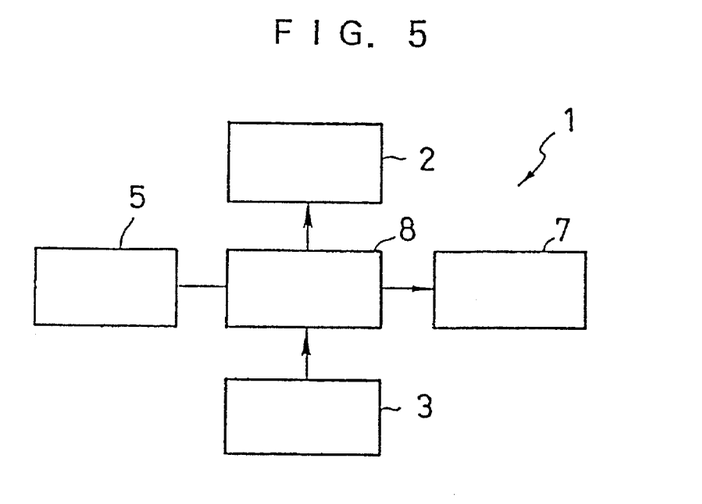
FIG. 5 is a block diagram of the preferred embodiment of the present invention.
Figure 6:
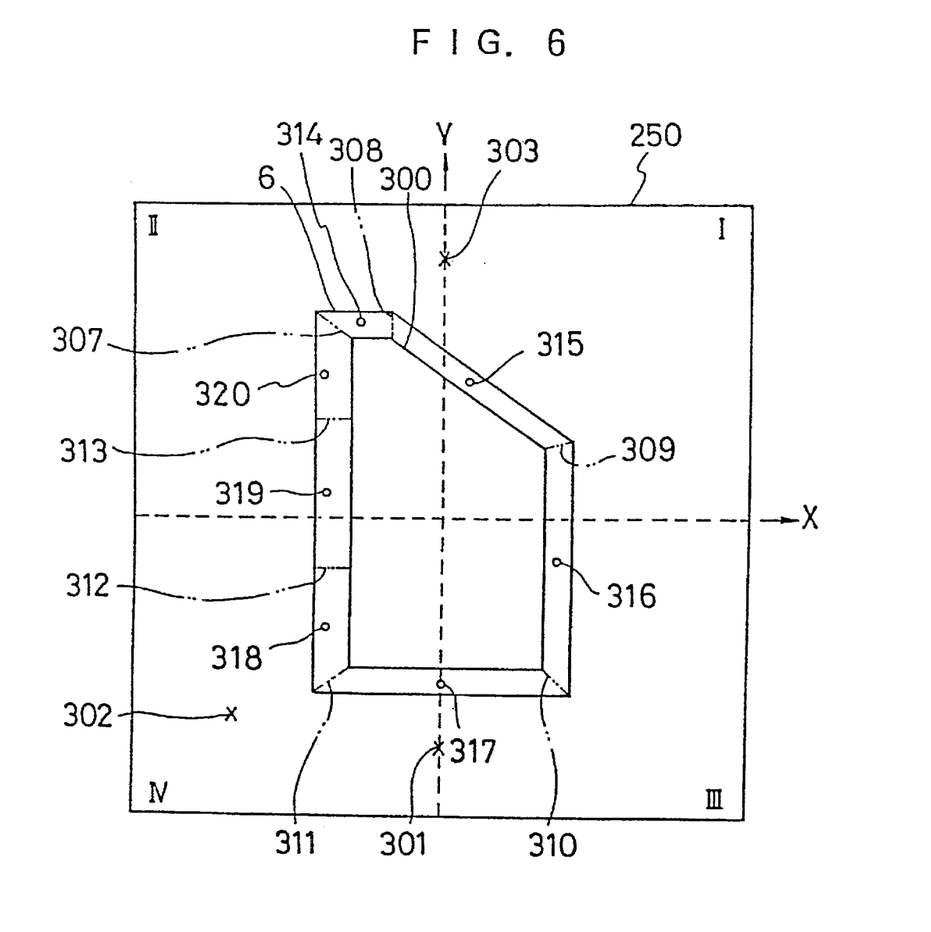
FIG. 6 illustrates a displayed picture of a display unit of FIG. 5.

In operation, a plate-like glass material 6 is so selected that a cutting margin with respect to a target plate of glass 300 to be obtained finally, is minimized in area thereof, and the thus selected material is placed on the plate-like glass material receiving table 200. The input unit 3 is then operated to designate the target plate of glass and reads data on the shape of the designated target plate of glass from the storage unit 5. The read data on the shape of the target plate of glass 300 is fed to the control unit 8, which displays the shape of the target plate of glass 300 on the display screen 250 of the display unit 7 on the basis of the read data on the shape, as shown in FIG. 6. The input unit 3 is then operated to input data on the shape of the plate-like glass material 6 placed on the plate-like glass material receiving table 200. As shown in FIG. 6, the control unit 8 displays the shape of the plate-like glass material 6 on the display screen 250 of the display unit 7. Data on the shape of the plate-like glass material 6 input by the input units 3 is, for example, like X=−300 (mm), Y=500 (mm), X=−100 (mm), Y=500 (mm), X=500 (mm), Y=250 (mm), X=500 (mm), Y=−500 (mm), X=−300 (mm), and Y=−500 (mm) clockwise, stating with a quadrant II.

The input unit 3 is further operated to input data on the standby position of the cutter head 32, cutters 61 and 61a, pushing rods 64, 64a, and grinding head 112 in the X-Y plane, and the control unit 8 displays those data items as marks 301, 302 and 303 display on the display screen 250 of the display unit 7. The input unit 7 is further operated to input data on the number of end cutting lines to be formed by the cutters 61, 61a; data on the sequence of forming the end cutting lines, and data on the respective positions of the end cutting line (the starting and ending positions of the end cutting lines in the X-Y plane) to display those data items on the display screen 250 of the display unit 7. For example, if the number of end cutting lines to be formed is 7, those lines are displayed as lines 307–313 on the display screen 250. The number of end cutting lines to be formed is determined by the user on the basis of the shapes of the plate-like glass material 6 and the target plate of glass 300 displayed on the display screen 250 of the display unit 7. After the end cutting lines to be formed are displayed in this way, the input unit 3 is further operated to input data on the number of points of push by the pushing rods 64, 64a and data on the pushing positions in the X-Y plane to thereby display those data items as points 314–320 on the display screen 250 of the display unit 7.

Data on the shapes of the target plate of glass 300 and of the plate-like glass material 6, data on the standby position, data on the sequence of end cutting line formation, data on the positions of the end cutting lines and data on the number or pushing points and data on the pushing positions in the X-Y plane are changed and corrected by commands from the input unit 3.

The input unit 3 is further operated to input data on the moving speed of the cutter head 32, cutters 61, 61a, pushing rods 64, 64a and grinding head 112 in the X-Y plane and data on the rotational speed of the wheel 111. Those data items may be displayed on the display screen 250 of the display unit 7 or left stored in the storage of the control unit 8.

After these data items are input, the input unit 3 is operated to input a starting command to perform the following operations in the glass material working unit 1 on the basis of the input various data items and the program stored beforehand in the storage of the control unit 8.

First, the motors 38, 46, 73, 73a, 81, 81a, 118 and 131 are operated in accordance with the standby position data input as mentioned above to move the cutter head 32, cutters 61, 61a, pushing rods 64, 64a, grinding head 112, support base 33 and sucking unit 113 in the X-Y plane to thereby dispose the cutter head 32, cutters 61, 61a, pushing rods 64, 64a, and grinding head 112 at the standby positions displayed by the marks 301–303 on the display screen 250 of the display unit 7 relative to the plate-like glass material 6 to be disposed. The slider 147 is also disposed at its initial position of FIG. 1 by the operation of the motor 141. The air cylinder 165 of the lifting unit 153 is operated to lower the sucking unit 161 to thereby apply a sucking disk of the sucking unit 161 to the plate-like glass material 6 placed on the glass material receiving table 200 such that the sucking unit 161 sucks that plate-like glass material 6 thereon. Thereafter, the air cylinder 165 is operated in a manner reverse to that mentioned above to lift the sucking disc of the sucking unit 161 along with the glass material by a given quantity until the lifting operation of the sucking unit 161 by the air cylinder 165 stops.

After the sucking unit 161 has lifted the plate-like glass material 6, the motor 141 is operated to rotate the screw shaft 145 to thereby move the support frame 150 in the X direction through the slider 147 and arm 149. As a result, the slicking unit 161 with the glass material 6 thereon is moved to a predetermined position on the support base 33, whereupon the operation of the servo motor 141 is stopped. The air cylinder 165 is again operated to lower the sucking disc of the sucking unit 161 by a predetermined quantity to thereby place the plate-like glass material 6 sucked on the sucking unit 161 on the support base 33. Thereafter, the sucking operation of the sucking unit 161 is released to thereby again operate the air cylinder 165 reversely to lift the sucking unit 161 by a predetermined quantity. Thereafter, the operation of the air cylinder 165 is stopped and the motor 141 is rotated reversely to move the support frame 150 in the X direction. The sucking unit 161 is then moved to the glass material receiving table 200 which is at the original position thereof.

When this occurs, the reversing operation of the motor 141 is stopped to thereby operate the motors 38 and 46 in accordance with data on the shape of the target plate of glass 300 displayed on the display screen 250 of the display unit 7. Thus, the cutter head 32 is moved in the X direction while the support base 33 is moved in the Y direction, so that the cutter head 32 is moved in the X-Y plane depending on the shape of the target plate of glass 300 displayed on the display screen 250 relative to the support base 33 or the plate-like glass material 6. During the movement of the cutter head 32 depending on the shape of the target plate of glass 300, the air cylinder 36 is operated to lower the cutter 31 such that the cutter 31 presses the plate-like glass material 6 placed on the support base 33 to thereby form a main cutting line 10 corresponding to the shape of the target plate of glass 300 disposed on the display screen 250 of the display unit 7 on the plate-like glass material 6 on the support base 33. When the formation of the main cutting line 10 is completed, the motors 38 and 46 are operated such that the cutter head 32 is brought to a standby position displayed on the display screen 250 of the display unit 7 relative to the plate-like glass material 6 and then the motors 38 and 46 are then stopped.

The air cylinder 166 is then operated to lower the sucking disc of the sucking unit 162 to the plate-like glass material 6 and suck same. Thereafter, the air cylinder 166 is operated in a manner reverse to that mentioned above to lift the sucking disc of the sucking unit 162 with the glass material 6 sucked thereagainst to the predetermined upper position, whereupon the operation of the air cylinder 166 is stopped to operate the motor 141 to move the support frame 150 in the X direction. As a result, the sucking unit 162 with the glass material 6 sucked thereagainst is also moved to the support unit 66. In the operation of the air cylinder 166 in this stage, the air cylinder 165 on the glass material receiving table 200 is also operated like the air cylinder 166 to cause the sucking unit 161 to lift another plate-like glass material 6 placed newly on the table 200. As a result, the new plate-like glass material 6 is moved to a predetermined position on the support base 33 by the movement of the support frame 150 in the X direction, whereupon the motor 141 is stopped and the air cylinders 165 and 166 are operated in a manner reverse to that mentioned above to lower the sucking units 161 and 163 such that the respective plate-like glass materials 6 are placed on the support base 33 and the belt 97 of the support unit 66. Thereafter, the sucking operation of the sucking units 161 and 163 is released to thereby operate the air cylinders 165 and 166 reversely again to lift the sucking units 161 and 163 by a predetermined quantity, whereupon the air cylinders 165 and 166 are stopped and the motor 141 is operated reversely to move the support frame 150 in the X direction. The sucking units 161 and 163 are moved to the plate-like glass material receiving table 200 and the support base 33 which are at the original positions of the sucking units 161 and 163, respectively, whereupon the reversing operation of the motor 141 is stopped. A main cutting line 10 is formed in a manner similar to that mentioned above on the plate-like glass material 6 placed on the support base 33 while the formation of an end cutting line 12 and the breaking-off operation along the end and main cutting lines 12 and 10 are performed on the glass material 6 placed on the belt 97 of the support unit 66.

The formation of the end cutting line 12 and the breaking-off operation along the end cutting line 12 in areas corresponding to quadrants III and IV of FIG. 6 are performed by the end cutting line forming unit 13 and the breaking-off unit 14, respectively. In parallel to those operations, the formation of the end cutting line 12 and the breaking-off operation along the end cutting line 12 in areas corresponding to quadrants I and II of FIG. 6 are similarly performed by the end cutting line forming unit 13a and the breaking-off unit 14a, respectively. The formation of the end cutting line 12 by the end cutting line forming unit 13 and the breaking-off operation of the breaking-off unit 14 along the end cutting line 12 will be described next. First, the motors 73 and 81 are operated in accordance with data on the end cutting lines 310 and 311 displayed on the display screen 250 of the display unit 7 to move the slider 77 in the X and Y directions. As a result, the cutter 61 is moved in the X-Y plane in correspondence to the end cutting lines 310 and 311 displayed on the display screen of the display unit 7 relative to the support unit 66, that is, the plate-like glass material 6 placed on the support unit 66. During the movement of the cutter 61 corresponding to the end cutting lines 310 and 311, the air cylinder 62 is operated to lower the cutter 61 to press the plate-like glass material 6 placed on the support unit 66 to thereby form end cutting lines 12 corresponding to the end cutting lines 310 and 311 displayed on the display screen of the display unit 7 on the glass material 6 placed on the support unit 66. Alternatively, the air cylinder 167 may be operated to lower the sucking disc of the sucking unit 163 to press the glass material 6 against the belt 97 of the support unit 66 for fixing purposes during the formation of the end cutting line 12. When the formation of the end cutting line 12 is completed, the motors 73 and 81 are operated in accordance with data on the pushing points 316–318 displayed on the display screen of the display unit 7 to move the slider 77 in the X and Y directions. As a result, the pushing rod 64 is now moved in the X-Y plane in correspondence to the pushing points 316–318 displayed on the display screen of the display unit 7 relative to the glass material 6 placed on the belt 97 of the support unit 66. When the pushing rod 64 is sequentially disposed at positions corresponding to the pushing points 316–318, whereupon the movement of the slider 77 is stopped for a predetermined time. During that time the air cylinder 65 is operated to lower the pushing rod 64 and push same against the glass material 6 to thereby sink the flexible resilient belt 97 slightly. As a result, the glass material 6 is broken off along the main cutting line 10 and the end cutting line 12. When the breaking-off operation of the glass material 6 at all positions corresponding to the pushing points 316–318 is completed and the glass material 6 is broken off along the main cutting line 10, the motors 73 and 81 are operated such that the slider 77 are moved to the standby positions displayed on the display screen of the display unit 7 relative to the glass material 6, and are stopped. The air cylinder 167 is then operated to lower the sucking disc of the sucking unit 163 to suck the glass material 6. The air cylinder 167 is then operated reversely so as to lift the glass material 6.

While in the present embodiment the glass material 6 is broken off along the main and end cutting lines 10 and 12 by the sinking operation of the belt 97, arrangement may be such that, for example, a plate-like glass material receiving table having a step and movable in the X-Y plane may be provided on a lower surface of the belt 97 wherein the step is positioned on the main cutting line 10 and that the receiving table is moved by a moving unit in correspondence to the movement of the pushing rod 64. In this case, the glass material 6 is supported on upper surface of the table bounded by the step while the glass material 6 is pushed by the pushing rod 64 against the lower surface of the table bounded by the step to thereby break off the glass material 6 along the main and end cutting lines 10 and 12. Preferably, the sucking disc of the sucking unit 163 presses the glass material 6 against the belt 97 such that the central portion of the glass material 6 does not float from the belt 97, which applies to the above embodiment.

When the glass material 6 is brought to the predetermined upper position, the operation of the air cylinder 167 is stopped and the motor 141 is operated to move the frame 147 in the X direction. As a result, the sucking unit 163 which has lifted the glass material 6 is moved also toward the sucking unit 113. During the operation of the air cylinder 167 in this case, the air cylinder 165 and 166 over the receiving table 200 and support base 33, respectively, are operated like the air cylinder 167 such that the sucking unit 161 lifts another new plate-like glass material 6 placed on the receiving table 200 and the glass material 6 with the main cutting line 10 formed thereon placed on the support unit 33 is lifted by the sucking unit 162. As a result, the new glass material 6 and the glass material 6 with the main cutting line 10 formed thereon are moved toward the support base 33 and support unit 66 by the operation of the support frame 150 in the X direction. During this movement of those glass materials the motor 91 is operated to move the belt 97 and the resulting cullets remaining on the belt 97 are moved to and put into the cullet container 100. When all the cullets on the belt 97 are put into the cullet container 100, the operation of the motor 91 and hence the belt 97 is stopped.

When the respective glass materials 6 are brought to the predetermined positions on the sucking unit 113, support unit 66 and support base 33, the operation of the motor 141 is stopped, the air cylinders 165–167 are operated in a direction reverse to that mentioned above to lower the sucking units 161 and 163 such that the respective glass materials 6 are placed on the support base 33, the belt 97 on the support unit 66 and the sucking unit 113, respectively. Thereafter, the sucking operation of the sucking units 161–163 is released to thereby operate the air cylinders 165–167 again in the reverse direction to lift the sucking units 161–163 by a predetermined quantity. Thereafter, the operation of the air cylinders 165–167 is stopped to operate the motor 141 reversely to move the support frames 147 and 150 in the X direction, and the sucking units 161–163 are moved to the plate-like glass material receiving table 200, support base 33 and support unit 66 which are at the positions of the original positions of the sucking units 161–163, respectively, whereupon the reversing operation of the motor 141 is stopped. The formation of a main cutting line 10 is performed on the glass material 6 placed on the support base 33 in a manner similar to that mentioned above. The formation of an end cutting line 12 and the breaking-off operation along the end cutting line 12 and the main cutting line 10 are similarly performed on the plate-like glass material 6 placed on the belt 97 on the support unit 66. The glass material 6 placed on the sucking unit 113 is ground along substantially the main cutting line 10.

In the grinding operation of the plate-like glass material 6 placed on the sucking unit 113 along substantially the main cutting line 10, first, the plate-like glass material 6 placed on the sucking unit 113 is sucked and fixed to the sucking unit 113 by the operation of the sucking unit 113. The motors 118 are 131 are then operated in accordance with data on the shape of the target plate of glass 300 displayed on the display screen of the display unit 7 such that the grinding head 112 is moved in the X direction while the sucking unit 113 is moved in the Y direction. As a result, the grinding point of the grinding wheel 111 of the grinding head 112 rotated by the motor 116 is moved in the X-Y plane in correspondence to the shape of the target plate of glass 300 displayed on the display screen of the display unit 7 relative to the plate-like glass material 6. The degree of cutting (or grinding) in the plate-like glass material 6 by the grinding wheel 111 is set by operating the finely adjusting unit 126 beforehand. The broken-off periphery 15 of the plate-like glass material 6 placed on the sucking unit 113 is ground in accordance with the movement of the grinding point of the grinding wheel 111 in correspondence to the shape of the target plate of glass 300. When grinding the whole periphery of the broken-off plate-like glass material 6 is completed, the motors 118 and 131 are operated and stopped such that the grinding wheel 111 is brought to a standby position displayed on the display screen of the display unit relative to the plate-like glass material 6. The sucking operation of the sucking unit 113 is also stopped. The air cylinder 168 is then operated to lower the sucking disk of the sucking unit 164 to suck the plate-like glass material 6, and thereafter the air cylinder 168 is operated reversely so as to lift the plate-like glass material 6.

When the plate-like glass material 6 is lifted to a predetermined upper position, the operation of the air cylinder 168 is stopped to operated the motor 141 to thereby move the support frame 152 through the support frame 147 in the X direction. As a result, the sucking unit 164 which has lifted the plate-like glass material 6 is moved toward the conveying unit 201. In the operation of the air cylinder 168 in this case, the air cylinders 165–167 are also operated like the air cylinder 168 such that a new different plate-like glass material 6 placed on the glass material receiving table 200 is lifted by the sucking unit 161, the plate-like glass material 6 with the main cutting line 10 thereon on the support base 38 is lifted by the sucking unit 162 and the broken-off plate-like glass material 6 on the belt 97 is lifted by the sucking unit 163. Thus, the new plate-like glass material 6, the plate-like glass material 6 with the main cutting line 10 formed thereon and the broken off plate-like glass material 6 are moved to the support base 33, support unit 66 and the sucking unit 113, respectively, by the X direction movement of the support frames 47 and 150. During the movement of the new plate-like glass material 6, the glass material with the main cutting line thereon, and the broken-off plate-like glass material, the produced cullets 350 are put into a cullet container 100 in a manner similar to that mentioned above.

When the respective plate-like glass materials 6 are brought to predetermined positions on the conveying unit 201, sucking unit 113, support unit 66 and support base 33, the operation of the motor 141 is stopped and the air cylinders 165–168 are operated in a manner reverse to that mentioned above to lower the sucking disks of the sucking unit 161–164 such that the respective plate-like glass materials 6 are placed on the support base 33, the belt 97 of the support unit 66, the sucking unit 113 and the belt of the conveying unit 201. Thereafter, the sucking operation of the sucking unit 161–164 is released to again operate the air cylinders 165–168 reversely to lift the sucking unit 161–164 by a given quantity. Thereafter, the operation of the air cylinders 165–168 is stopped and the motors 141 is operated reversely to move the support frames 147, 150, 152 in the X direction. The sucking units 161–164 are moved to the glass material receiving table 200, support base 33, support unit 66 and sucking unit 113 which are at the original positions of the sucking units 161–164, whereupon the reversing operation of the motor 141 is stopped. A main cutting line 10 is formed on the plate-like glass material 6 placed on the support base 33 in a manner similar to that mentioned above; the formation of an end cutting line 12 and the breaking-off operation along the formed end cutting line 12 and the main cutting line 10 are operated on the plate-like glass material 6 placed on the belt 97 of the support unit 66; and the grinding along substantially the main cutting line 10 is performed in a manner similar to that mentioned above on the plate-like glass material 6 placed on the sucking unit 113. The plate-like glass material 6 placed on the belt of the conveying unit 201 is further discharged by the operation of the belt to the outside to thereby provide a plate of glass corresponding to the target plate of glass 300.

The above operations are repeated each time a new plate-like glass material 6 is placed on the glass material receiving table 200, and performed automatically in parallel with the formation of a main cutting line 10 and a cutting line 12, the breaking-off operation and grinding on the plate-like glass material 6 along substantially the main cutting line 10 in accordance with data input by the input unit 3 to the device.

When a different target plate of glass is to be obtained, the input unit 3 is operated to designate that target plate of glass, the data on the shape of the target plate of glass is read from the storage unit 5, and the above operations are repeated.

I claim:

1. A method for working a glass plate, comprising the steps of:

selecting a glass plate stock which has a minimum breaking-off margin with respect to a target glass plate;

reading out pre-stored shape data relating to a shape of said target glass plate;

displaying the shape of said target glass plate based on the read out shape data;

inputting data relating to a shape of a selected glass plate stock;

displaying the shape of the glass plate stock so as to surround the displayed shape of the target glass plate;

inputting data relating to standby positions of a cutting line and a pushing position based on the displayed shapes of the target glass plate and the glass plate stock;

displaying each standby position based on the input standby position data;

inputting data relating to an end cutting line position and data relating to a pushing position;

displaying the end cutting line and the pushing position based on the input data relating to the end cutting line position and the input data relating to the pushing position; and pushing and breaking-off the selected glass plate stock based on the read out data relating to the shape of the target glass plate, and the data relating to the shape of glass plate stock, the data relating to the standby positions, the data relating to the end cutting line and the input data relating to the pushing position, respectively.

2. A glass plate working device for carrying out the method according to claim 1, comprising:

breaking means for breaking glass plate stock to be worked;

input means for inputting data and commands relating to breaking items;

storage means for pre-storing shape data relating to a shape of a target glass plate and reading out said shape data therefrom in response to a command from said input means;

display means for displaying thereon the shape of the target glass plate based on the shape data relating to the target glass plate read out from said storage means, and for displaying the shape of said glass plate stock to be worked, an end cutting line and a pushing position in accordance with breaking data and commands from said input means; and control means for controlling operation of said breaking means in accordance with the shape of the target glass plate, the shape of the glass plate stock, the end cutting line, and the pushing position displayed on said display means.

3. A glass plate working device according to claim 2, wherein said breaking means comprises:

main cutting line forming means for forming a main cutting line on the glass plate stock, end cutting line forming means for forming the end cutting line on the glass plate stock bearing the main cutting line;

pushing means for pushing the glass plate stock bearing the main and end cutting lines to break off the glass plate stock along the main cutting line; and grinding means for grinding a periphery of the glass plate broken-off along the main cutting line by said pushing means.

4. A glass plate working device according to claim 3, wherein said breaking means further comprises:

conveying means for conveying the glass plate stock with the main cutting line formed thereon by said main cutting line forming means to said end cutting line forming means and said pushing means to form the end cutting line thereon and to break off the glass plate stock bearing said main and end cutting lines along the main cutting line, and conveying the broken-off glass plate to said grinding means to grind the periphery of the broken-off glass plate.

5. A glass plate working device according to claims 2, wherein said storage means pre-stores data relating to various different shapes for target glass plates.

* * * * *